Aug. 20, 1968  J. R. TENCH ET AL  3,397,815
SEALED STORAGE BATTERY CELL
Filed Dec. 21, 1966
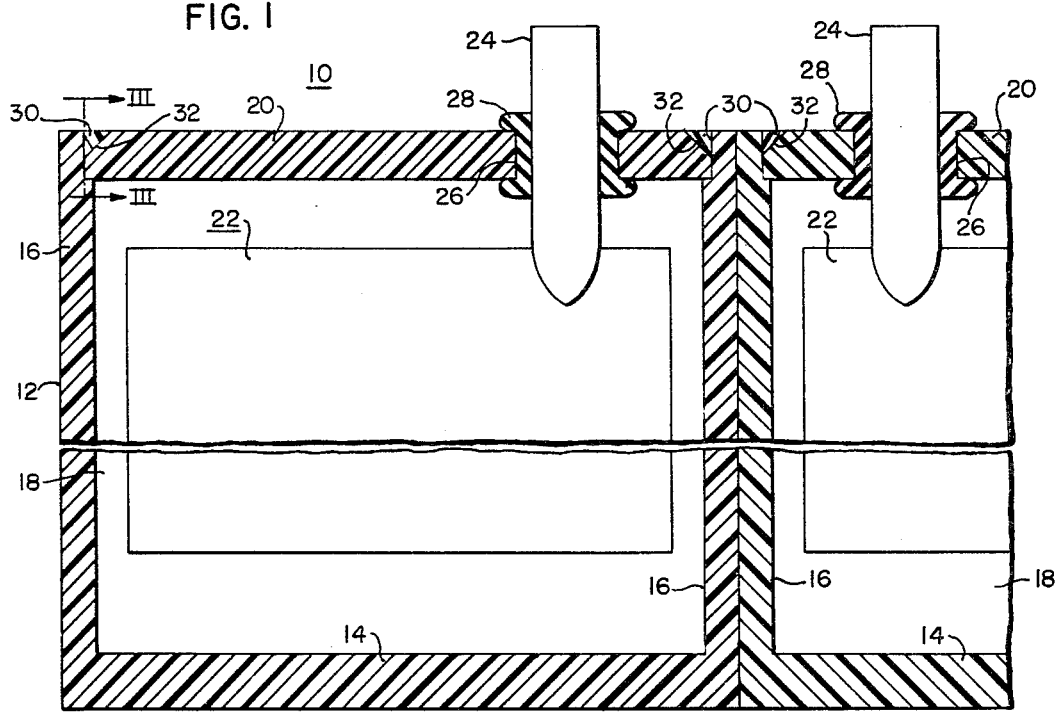
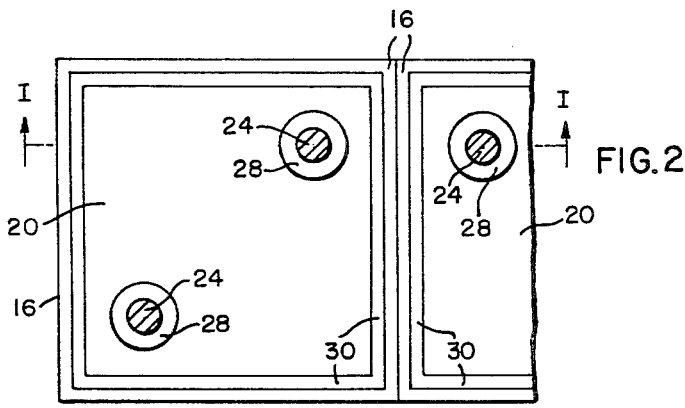
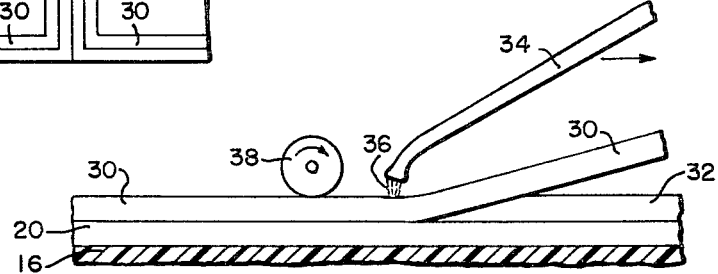
WITNESSES
INVENTORS
JOHN R. TENCH
LESLIE A. DOGGRELL
BY
ATTORNEY 0# United States Patent Office 3,397,815
Patented Aug. 20, 1968

3,397,815
SEALED STORAGE BATTERY CELL
John R. Tench, Pittsburgh, and Leslie A. Doggrell, Pitcairn, Pa., assignors to Westinghouse Electric Corporation, Pittsburgh, Pa., a corporation of Pennsylvania
Filed Dec. 21, 1966, Ser. No. 603,479
2 Claims. (Cl. 220—67)

ABSTRACT OF THE DISCLOSURE

A sealed storage battery cell comprising a casing forming a battery cell having an open end and a cover for the open end which cover is thermally fused to the casing by a heat weldable thermoplastic strip between the casing and cover.

---

This invention relates to a plastic battery cell or container having a cover secured in a fluid-tight manner.

The sealing of acid in storage battery cells has been a recurring problem, particularly in batteries of the lead-acid type. Various means have been employed to remedy the problem such as using thermoplastic pitch compound between the cover and casing of a rubber container. However, over a period of time, particularly during periods of extreme temperature variations, the sealing compound becomes brittle and often ultimately cracks or fractures. As a result traces of acid ultimately seep through to the outer surface of the cover and attack the terminal posts and connectors which may cause shorting which shortens the life of the cell.

It has been found that the foregoing problems may be overcome in accordance with this invention by providing a battery casing and cover composed of plastic which are integrally fused or welded together by the use of a thermoplastic welding rod and the application of heat thereto. Not only is a better seal provided between the battery casing and cover but the separate battery cells are isolated in a more permanent manner.

Accordingly, it is a general object of this invention to provide a sealed storage battery cell in which the cover is bonded to the casing in a permanent fluid-tight manner.

It is another object of this invention to provide a sealed storage battery cell comprising a cover of thermoplastic resin which is fused to the side walls of the battery casing.

It is another object of this invention to provide a method for making a sealed storage battery cell by the use of plastic welding rods and the application of heat thereto.

It is another object of this invention to provide a sealed storage battery cell that provides better battery maintenance such as facilitating the washing of the top of the battery to eliminate dirt, reducing short circuits.

Finally, it is an object of this invention to accomplish the foregoing objects and desiderata in a simple and effective manner.

These and other objects and advantages of the present invention will become more apparent when considered in view of the following detailed description and drawings, in which:

FIGURE 1 is a vertical sectional view through a portion of a lead-acid type battery in which cell covers are bonded to the upper end of the walls of the casings, taken on the line I—I of FIG. 2;

FIG. 2 is a plan view of a part of a battery showing a peripheral weld between a cover and the walls of the casing; and FIG. 3 is an enlarged fragmentary sectional view taken along the line III—III of FIG. 1 showing the manner in which a plastic welding strip is inserted in place and heat fused between the cover and the casing and then rolled in place.

Briefly, the present invention provides a leak-proof battery having an integral battery cell casing whose side walls form an open top end, a closure or cover for the open end which has edge surfaces contiguous to the top ends of the side walls of the casing, both the casing and cover being composed of a resinous plastic, and a thermoplastic material disposed between and thermally fused to the cover edge surfaces and the adjacent walls of the casing in a fluid-tight manner.

The invention is also directed to a method of producing a fluid-tight joint between a battery casing and a cover therefor including the steps of providing space means between the casing and the cover, inserting an elongated strip of plastic material in the space means and thermally fusing the plastic material to the adjacent casing and cover surface to form an integral unit between the casing and the cover. The resinous plastic is preferably polypropylene.

In FIG. 1 a battery of the lead-sulfuric acid type is generally indicated at 10. It includes a casing 12 having a bottom wall 14 and vertical cell walls 16 to provide an integral cell 18. While a single cell may be used for some purposes, usually a battery comprises a plurality of cells 18 juxtaposed to each other. The battery 10 as illustrated comprises two cells 18 and it also includes similar cell covers 20, cell plates 22, and terminal posts 24 in each cell. The cell plates 22 and terminal posts 24 are of conventional construction. The post 24 extends through an opening 26 in the cover 20 in a fluid-tight manner such as by the use of a grommet 28, which grommet is preferably composed of a resilient material resistant to battery acid such as butyl rubber.

As shown in FIGS. 1 and 2 a bonding strip 30 is provided between the cover 20 and the cell walls 16 and is heat bonded in place to the adjacent edge surfaces of the cover nad walls such as by fusion to provide a fluid-tight seal completely around the cover 20. The strip 30 is preferably composed of a thermoplastic resinous plastic, such as polypropylene, polyethylene, polyvinyl chloride, and mixtures of two or more, heat bondable to the cover and walls. To provide adequate bond, space means are provided between the edge walls of the cover 20 and the casing wall 16, and such means may include either a clearance between the cover 20 and the wall 16, or, as shown in FIG. 1, a beveled surface 32 which with the surface of the wall 16 forms a V-shaped notch in which the strip 30 may be inserted.

The manner in which the strip 30 is inserted and welded is shown in FIG. 3. The elongated strip 30 is brought into place adjacent the beveled surface 32 and a nozzle 34 directs a blast 36 of heated gas such as nitrogen-enriched air. Pure nitrogen, carbon dioxide, argon and other gases may be used. The nitrogen-enriched air is composed of air to which 20% to 30% by volume of nitrogen gas is added. The mixture is heated as by an electrical resistance element to a temperature of from 500 to 550° F. for polypropylene in order to bring the strip 30 to a sufficiently high temperature so that it at least partly melts to cause a weld or fused bond between the surfaces of the beveled surface 32 and the upper ends of the cell walls 16 in contact with the melted strip. In addition, pressure is applied to the strip after it is in place and heated to the melting point, by suitable means such as a roller 38, so as to ensure a hermetic joint being produced. In the alternative, a molten plastic may be poured into the notch and then smoothed with roller 38. In this manner a fluid-tight joint is obtained between the cover 20 and the cell walls 16.

Accordingly, the present invention provides a sealed storage battery cell cover that solves the long existing problem of acid leakage between the cell walls and cell cover of a lead-acid type battery. Moreover, the device of the present invention provides for better maintenance of batteries and eliminates contamination due to dirt infiltration and minimizes short circuiting with the battery terminal posts.

The same sealed cell construction may be employed for alkaline batteries such as nickel-cadmium storage batteries.

It is understood that the above specification and drawings are merely exemplary and not in limitation of the invention.

What is claimed is:

1. A sealed storage battery cell comprising a battery cell casing having side walls forming an open end, a cover for the open end and having edge surfaces contiguous to the side walls of the casing, the casing and the cover being composed of a heat weldable thermoplastic material, and a bonding strip of a heat weldable thermoplastic material selected from at least one of the group consisting of polyethylene, polypropylene, and polyvinyl chloride fused to the adjacent edge surfaces of the casing and cover to form a fluid-tight connection and to provide an integral unit.

2. The leak-proof battery cell construction of claim 1 in which the thermoplastic material is polypropylene.

References Cited

UNITED STATES PATENTS 2,603,671   7/1952   Burns _____ 220—81

JAMES B. MARBERT, *Primary Examiner.*